Feb. 16, 1943. E. H. LAW 2,311,552
HAIR CUTTING OR CLIPPING MACHINE
Filed Dec. 31, 1938 4 Sheets-Sheet 4
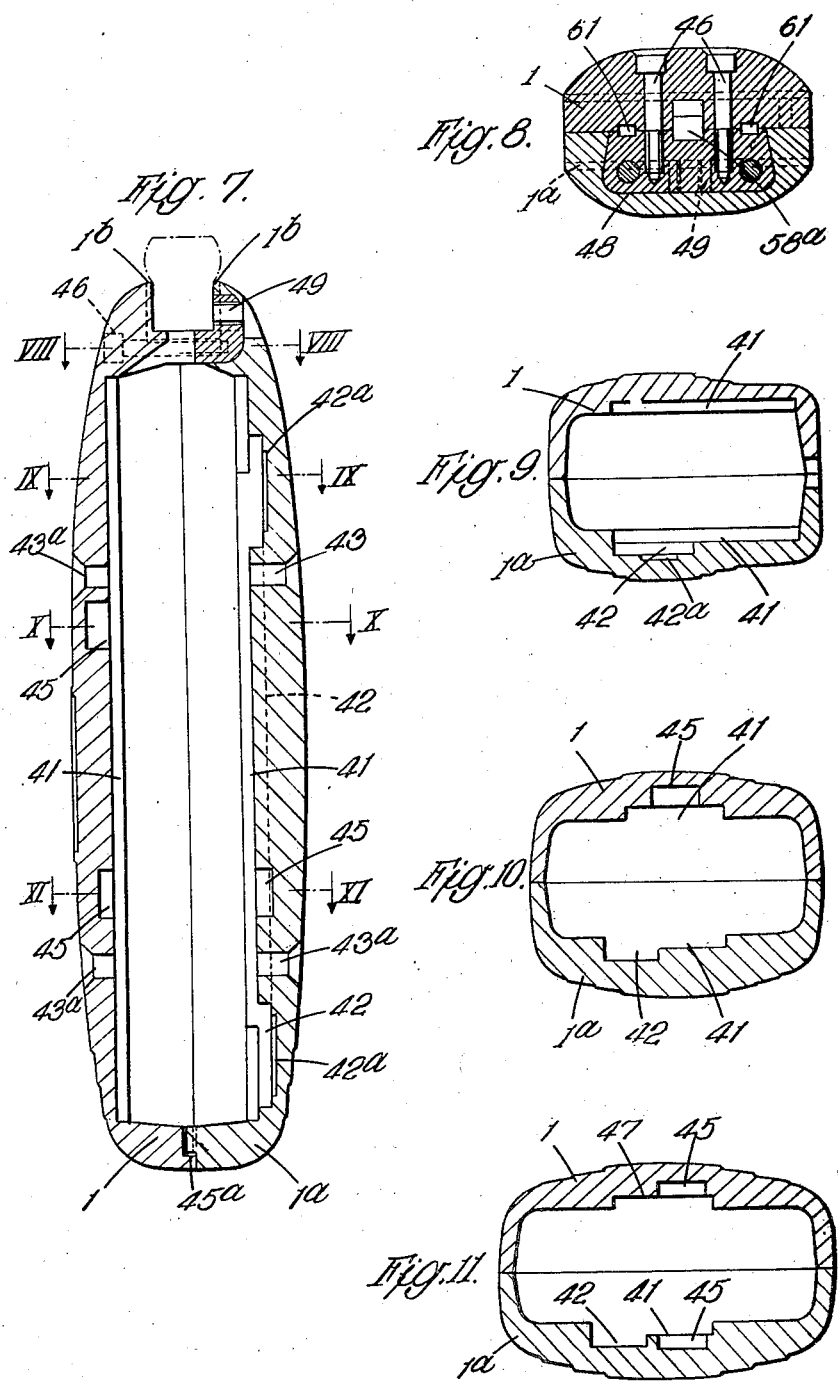
INVENTOR:
EDGAR HAROLD LAW
BY: Haseltine, Lake & Co.
ATTORNEYS Patented Feb. 16, 1943

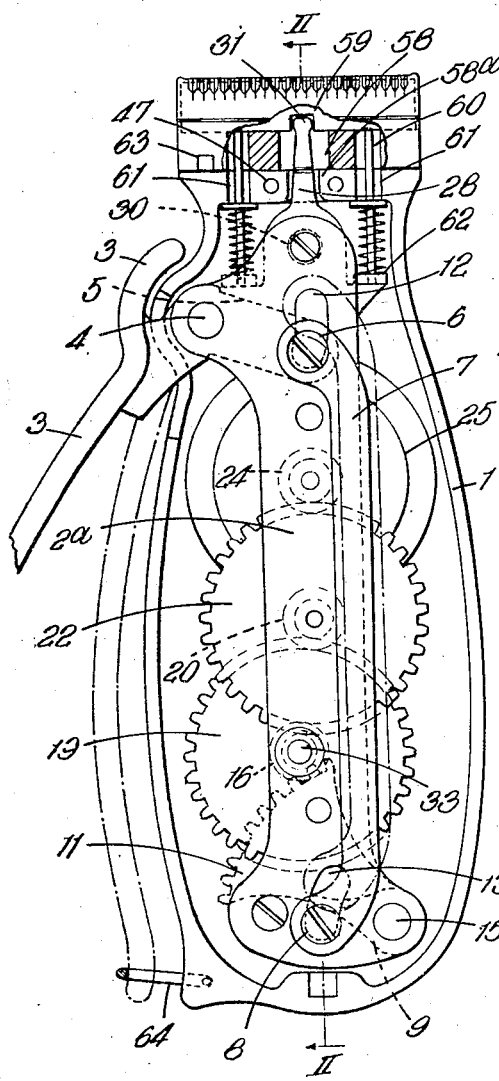
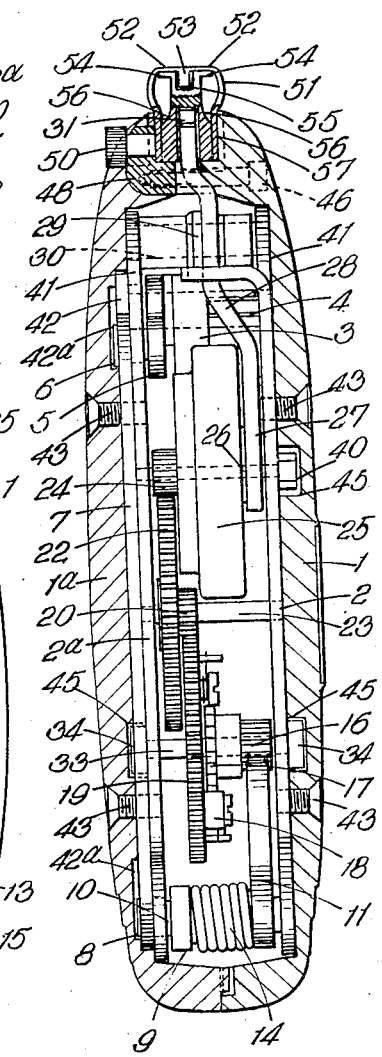

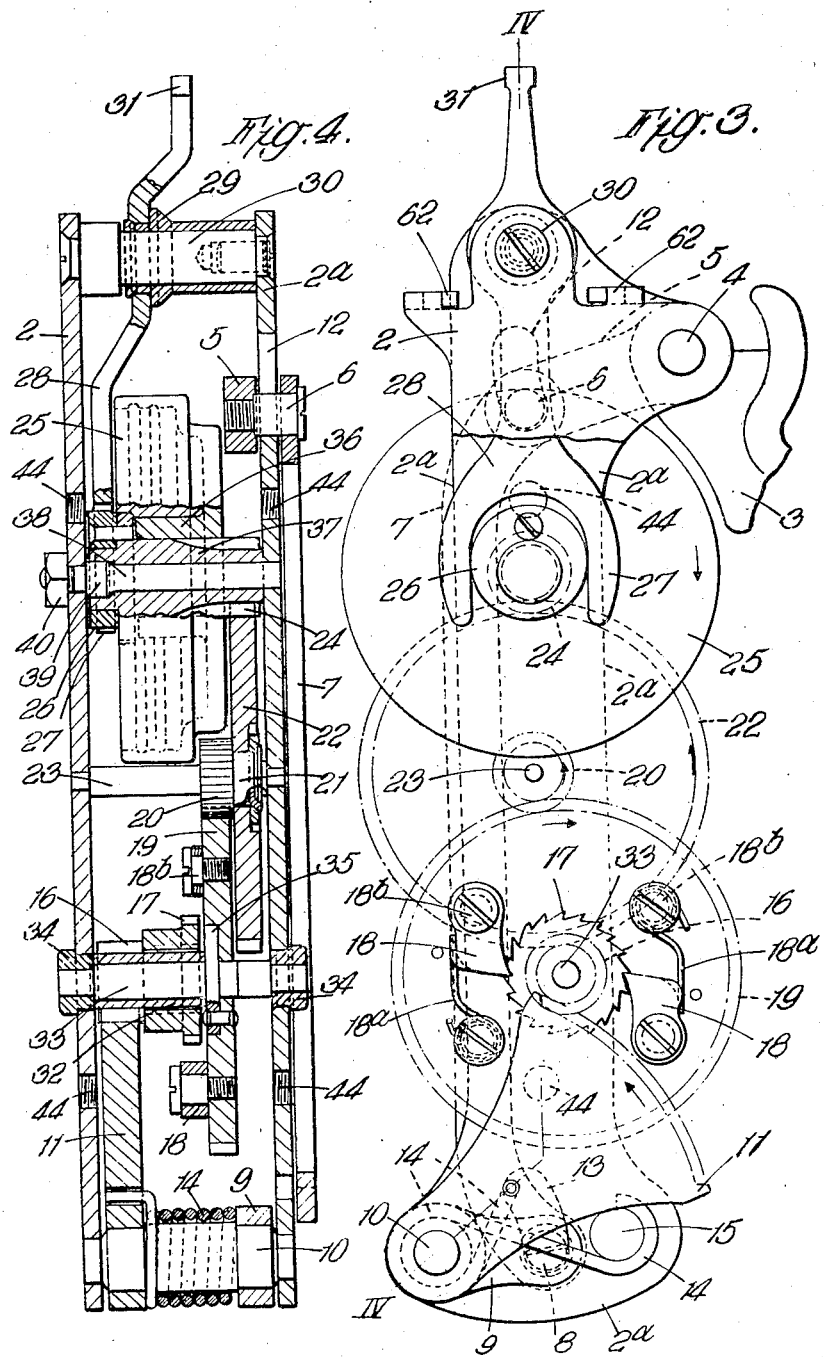

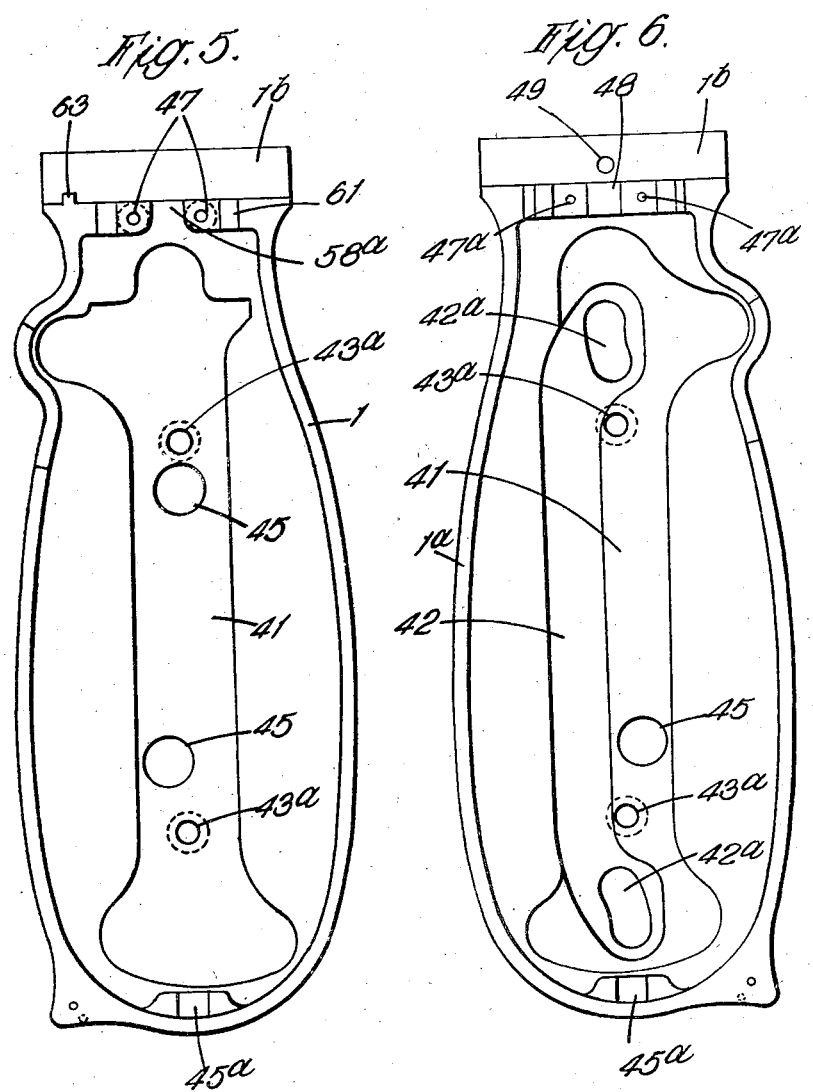

2,311,552

UNITED STATES PATENT OFFICE 2,311,552

HAIR CUTTING OR CLIPPING MACHINE

Edgar Harold Law, Kingsbury, England, assignor to Rolls Razor Limited, London, England, a British company Application December 31, 1938, Serial No. 248,694
In Great Britain January 7, 1938

14 Claims. (Cl. 74—133)

This invention relates to shaving or hair clipping devices, and has more particular reference to devices of this type which are known as "dry shavers."

The chief object of the present invention is to provide an improved construction of a mechanically operated dry shaver and it comprises several novel features.

According to the invention, a shaving or hair clipping device having a casing or handle comprises a rotary member adapted to impart in known manner reciprocating motion to a movable cutter, which rotary member is preferably a flywheel, rotating means for rotating said rotary member, a manual operating lever projecting from said casing for actuating said rotating means and said rotary member, said rotating means comprising a toothed quadrant arranged movably upon a pivot so that its toothed periphery is adapted to oscillate in an arcuate path, which toothed periphery is in mesh with a pinion which is so associated with a one-way clutch device that it can transmit power in only one direction of its rotation, a crank rigidly associated with said quadrant and adapted by its partial revolution in one direction and the other to cause oscillating partial rotation of the quadrant, a connecting lever connected to said crank and also so connected to said manual operating lever that reciprocation of the manual operating lever at constant speed causes alternating forward and backward partial rotation of the quadrant at varying speeds, the arrangement being such that during the part of this alternating partial rotation that is conveyed to the said rotary member the said crank is moving with a compound motion both longitudinally of the said connecting lever and transversely thereof in such a manner that there is imparted to the rotary member a continuously increasing or accelerated angular movement measured in degrees for each consecutive degree of angular movement of the operating lever during the operative stroke of the latter.

"The arrangement may be such that at the commencement of the operative stroke of the operating lever the line joining the centre of the crank and the centre of the pivot of the quadrant is substantially at right angles to the longitudinal axis of the connecting lever, and the operative stroke of the operating lever causes the crank to revolve through a suitable angle, say of about 90 degrees, moving with a motion which is compounded of motion longitudinal in respect of the connecting lever and motion to a progressively increasing extent transverse to that motion so that there is imparted to the quadrant and thereby to the rotary member a continuously increasing or accelerated angular movement measured in degrees for each consecutive degree of angular movement of the operating lever during the operative stroke of the latter.

In order that the invention may be clearly understood and readily carried into effect, the same will now be more fully described with reference to the accompanying drawings, in which:

Figure 1 is a rear face view of one form of the improved dry shaver with part of the casing removed to show the interior operating mechanism and gearing.

Figure 2 is a sectional view taken on the line II—II of Figure 1 looking in the direction of the arrow, the interior mechanism, however, being shown in elevation.

Figures 3 and 4 are respectively a front face view and a sectional view (both on an enlarged scale) of the operating mechanism removed from the casing, the sectional view being taken approximately on the line IV—IV of Figure 3.

Figures 5 and 6 illustrate the interior formation of the two parts of the casing.

Figure 7 is a sectional view of the casing showing the two casing parts secured together.

Figures 8, 9, 10 and 11 are transverse sectional views taken on the lines VIII—VIII, IX—IX, X—X and XI—XI of Figure 7.

In the example illustrated, the casing of the device, which may be made of a moulded thermoplastic material, comprises two generally similar parts 1 and 1a suitably held together and adapted to receive between their upper parts the cutter head as hereinafter referred to, and also being shaped to receive the operating mechanism which is carried by members 2, 2a held together in spaced relation to form a frame to which an operating handle or lever 3 is pivotally mounted at 4, the said lever being so formed as to extend through a slot formed between the two parts of the casing so that part of the hand lever is outside the casing as shown in Figure 1. In Figure 3, only the upper part of the frame member 2a is shown. The hand operating lever 3 has an arm or lever 5 which by means of a screw pin 6 is pivotally connected to the upper end of a link 7 lying outside the frame member 2a and being pivotally connected at its lower end by a pin 8 to an arm or lever 9 secured to a shaft 10 which has fixed thereon a toothed quadrant 11.

The two pins 6 and 8 are respectively freely disposed in arcuate slots 12 and 13 in the said frame member 2a to permit of the angular movement of the aforesaid arms 5 and 9 when the operating lever 3 is moved about its pivot 4 for actuating the operating mechanism. The toothed quadrant 11 is under the influence of a torsion spring 14, one end of which engages or is fixed to the quadrant and the other bears against a pin 15 fixed in the said frame members 2 and 2a, so that when the hand lever is pressed inwardly towards the casing, the quadrant 11 is moved through the medium of the arms 5 and 9 and the connecting link 7 against the action of the torsion spring 14 which through the said arms and link returns the operating lever to its outward position when the pressure thereon is removed. The toothed quadrant 11 engages with a pinion 16 associated with ratchet and pawl mechanism 17 and 18, the pawls 18 of which are mounted on and rotatable on a spindle 33 with a gear wheel 19 in mesh with a pinion 20 on a sleeve 21 to which is secured another gear wheel 22, preferably made of synthetic resin. The pinion 20 and gear wheel 22 are carried by a spindle 23 which is rotatably mounted in the frame members. The gear wheel 22 is in mesh with a pinion 24 on a fly wheel 25 having an eccentric 26 which engages the forked lower end 27 of a lever 28 pivotally mounted by means of a sleeve 29 on a distance pin 30 disposed between the upper ends of the said frame members. The upper end 31 of the lever 28 is adapted to engage with and impart reciprocation to the inner cutter of the cutter head as hereinafter described. It will be appreciated that when the hand operating lever 3 is pressed inwardly against the action of the torsion spring 14, the quadrant 11 rotates the pinion 16 and the ratchet wheel 17 which through the pawls 18 imparts rotation to the gear wheels and pinions 19, 20, 22 and 24, and the fly wheel 25, whose eccentric 26 therefore oscillates the lever 28 which in turn imparts reciprocatory movement to the inner cutter of the cutter head. When the pressure on the operating lever 3 is released, the spring 14 returns the lever to its outward position, the ratchet wheel 17 then moving freely against the spring loaded pawls. By applying pressure to the lever 3 and then releasing it, repeatedly, the drive can be continuously effected so as to cause the inner cutter of the cutter head to be maintained in a continuous state of reciprocation. The arm 5 which is movable with the hand operating lever 3 is longer than the arm 9 which is connected with the aforesaid quadrant 11, and the relative dispositions of the arms 5 and 9 are so arranged that when the lever 3 is pressed inwardly, a continuously increasing or accelerated angular quadrant movement measured in degrees is afforded for each consecutive degree of angular movement of the hand operating lever 3, thus allowing of evening-up or distribution of the effort necessary to overcome inertia of the rotating parts during the operative strokes of the hand operating lever, thereby enabling the rotating parts to reach the highest speed of rotation in the quickest time for the effort available or produced by hand operation. The increased acceleration can, however, be obtained in other ways.

The various parts of the operating mechanism as shown are mounted between the two frame members 2 and 2a with the exception of the aforesaid connecting link 7, and all the rotating parts are mounted to ensure smooth running and a minimum of friction. The details and arrangement of the mounting of the parts are more particularly illustrated in Figures 3 and 4. The ratchet and pawl mechanism 17 and 18 is designed to afford a smooth and positive action. The pawls 18 have enlarged ends which are grooved in their outer surfaces to receive the ends of springs 18a secured to studs 18b which are carried by the gear wheel 19 as shown in Figure 3, the said springs serving to maintain the pawls 18 in engagement with the ratchet wheel 17. The ratchet wheel 17 is splined on a sleeve 32 rotatable on a shaft 33 which rotates in end bearings 34 fixed in the frame members 2 and 2a, which sleeve also carries the pinion 16 at one end. The gear wheel 19 carrying the pawls 18 is secured to a flange 35 on the shaft 33 so as to be rotatable with the shaft. The ratchet wheel 17, sleeve 32 and the pinion 16 are capable of rotation on the shaft 33, when the quadrant is moved by the actuation of the hand lever, the ratchet wheel imparting the driving movement to the gear wheel 19 through the pawls. When the pressure on the hand lever is released and the quadrant is moved in the opposite direction by its spring, the ratchet wheel "free wheels" past the pawls on the gear wheel 19 which continues to rotate in the forward direction. It will be understood that any suitable form of free wheel device may be used instead of the ratchet and pawl arrangement.

With regard to the fly wheel arrangement which is especially designed and arranged to ensure smooth running with as little friction as possible, the fly wheel 25 comprises a casing made of brass or the like having an internal sleeve 36 formed integrally therewith and secured to a central bush 37, this casing being filled with lead. The eccentric member 26 is mounted around and secured to one end of the aforesaid bush 37, which latter freely surrounds a hardened steel spindle 38 fitting at one end in the frame member 2 and being secured at the other end to the other frame member 2a by means of a shoulder 39 and a nut 40 screwed on this end of the spindle as shown in Figure 4. The pinion 24 associated with the fly wheel is as shown formed by teeth which are cut in the other end of the bush 37. Thus it will be understood that the several parts associated with the fly wheel constitute a self-contained unit which revolves on the fixed spindle 38. The oscillatory lever 28 which is operated by the eccentric 26 engaging its forked end 27, engages the inner cutter of the cutter head at its free end 31 and the fulcrum pin 30 is disposed as near to the upper part of the device as possible in order to give an increased leverage, such an arrangement enabling the device to work or run easily with little work on the eccentric and the sliding inner cutter. The aforesaid lever 28 is also so shaped that its centre part is disposed in a plane equi-distant between the planes containing the two ends 27 and 31 of the said lever, the end 31 of the lever being disposed approximately in the central vertical plane of the mechanism. The operating mechanism and gearing shown more particularly in Figures 3 and 4 with the operating handle 3, forms a complete unit, which as such can be placed in and removed from the casing parts 1 and 1a without the fitting or removal of any parts other than securing screws.

The frame parts 2 and 2a are closely held within the casing parts 1 and 1a for which purpose the latter are formed internally with recesses 41 that correspond with the outline of the frame members so as to receive the latter. In addition to the recesses 41, a recess 42 is formed in the casing 1a and this is made wide enough to accommodate the connecting link 7 and permit of its compound movement when the hand lever 3 is angularly moved. Further, arcuate recesses 42a are provided freely to receive the exposed parts of the heads of the pins 6 and 8 which travel in the arcuate slots 12 and 13 in the frame member 2a. The frame members are held within the casing parts by means of screws 43 (see Figure 2) which are passed through holes 43a in the casing parts to screw into tapped holes 44 in the said frame members (see Figures 3 and 4). The said casing parts are also formed with recesses 45 to receive the end bearings 34 and the nut 40 which project from the outer sides of the frame members. The two parts 1 and 1a of the casing have interfitting locating parts 45a at the lower ends and in addition to being secured to the frame members by the screws 43 are held together at the upper part with the cutter head interposed between walls 1b formed thereon, by means of screws 46 which pass through holes 47 in the part 1 and screw into tapped holes 47a in a metal insert 48 embedded in the casing part 1a. This metal insert 48 has a threaded hole 49 to receive a screw 50 which holds the cutter head in position (see Figure 1).

The cutter head which may be of any suitable type, is in the example shown retained between the walls 1b at the upper ends of the casing parts which have adjoining ledges to form a seating for the cutter head which can be removed without separating the casing parts. In the example shown, the cutter head comprises an outer cutter 51 having transversely disposed teeth or blades 52 extending from a central longitudinal bar 53 and merging into curved side walls. The inner cutter has teeth or blades 54 on each side of a groove 55 that receives the said bar 53, and at the lower part it fits between walls 56 on the base 57 of the outer cutter, which latter has a recess that is engaged by the screw 50. The base also has an opening 58 through which the end 31 of the oscillating lever 28, which extends through an opening 58a between the ledges of the casing parts, passes to engage with an opening 59 in the base of the inner cutter. Two spring controlled rocking pins 60 project through openings 61 between the ledges of the casing parts and are pressed against the base of the inner cutter to maintain the inner cutter teeth or blades against the teeth or blades of the outer cutter, by the springs which are interposed between shoulders on the rods and lugs 62 on the frame member 2a, the inner cutter being guided mainly by the extremities of its teeth engaging slightly stepped portions on the outer cutter adjacent the curved side walls. When the operating hand lever is moved inwardly, the mechanism and gearing within the casing is operated to effect the oscillatory movement of the lever 28 which imparts rapid reciprocatory movement to the aforesaid inner cutter, so that the shaving operation can be effected by the co-operating teeth or blades on the inner and outer cutters when the outer cutter is pressed against the skin. Owing to the connection between the hand operating lever 3 and the quadrant 11, increased acceleration is imparted to the gearing and the inner cutter, and this is a feature of primary importance in the present invention. The cutter head, i. e. the outer cutter and the inner cutter may be mounted between the frame members carrying the gearing and operating mechanism, instead of being held between the casing parts 1 and 1a as above described. The inner cutter is spaced from the side walls of the outer cutter to provide cavities which receive cut hairs, and the walls 56 on the base 57 are shaped to divert the cut hairs from the lower part of the inner cutter, thus preventing them from entering between the fixed and moving parts. The outer cutter is readily removable and it has a groove in its base to engage a locating projection 63 on the casing part 1, so as properly to locate the cutter in position between the walls 1b on the upper ends of the casing parts wherein it is retained by the screw 50. The hand operating lever 3 can be retained in the inward position against the casing for packing purposes, and when the device is not in use, by means of a clip 64 pivoted in lugs on the lower ends of the casing parts and engaging the curved end of the lever 3 as shown in dotted lines in Figure 1.

What I claim and desire to secure by Letters Patent of the United States is:

1. In a shaving or hair clipping device having a casing or handle, a rotary member adapted to impart in known manner reciprocating motion to a movable cutter, which rotary member is preferably a flywheel, rotating means for rotating said rotary member, a manual operating lever projecting from said casing for actuating said rotating means and said rotary member, said rotating means comprising a toothed quadrant arranged movably upon a pivot so that its toothed periphery is adapted to oscillate in an arcuate path, which toothed periphery is in mesh with a pinion which is so associated with a one-way clutch device that it can transmit power in only one direction of its rotation, a crank rigidly associated with said quadrant and adapted by its partial revolution in one direction and the other to cause oscillating partial rotation of the quadrant, a connecting lever connected to said crank and also so connected to said manual operating lever that reciprocation of the manual operating lever at constant speed causes alternating forward and backward partial rotation of the quadrant at varying speeds, the arrangement being such that during the part of this alternating partial rotation that is conveyed to the said rotary member the said crank is moving with a compound motion both longitudinally of the said connecting lever and transversely thereof in such a manner that there is imparted to the rotary member a continuously increasing or accelerated angular movement measured in degrees for each consecutive degree of angular movement of the operating lever during the operative stroke of the latter.

2. In a shaving or hair clipping device having a casing or handle, a rotary member adapted to impart in known manner reciprocating motion to a movable cutter, which rotary member is preferably a flywheel, rotating means for rotating said rotary member, a manual operating lever projecting from said casing for actuating said rotating means and said rotary member, said rotating means comprising a toothed quadrant arranged movably upon a pivot so that its toothed periphery is adapted to oscillate in an arcuate path, which toothed periphery is in mesh with a pinion which is so associated with a one-way clutch device that it can transmit power in only one direction of its rotation, a crank rigidly associated with said quadrant and adapted by its partial revolution in one direction and the other to cause oscillating partial rotation of the quadrant, a connecting lever connected to said crank and also so connected to said manual operating lever that reciprocation of the manual operating lever at constant speed causes alternating forward and backward partial rotation of the quadrant at varying speeds, the arrangement being such that at the commencement of the operative stroke of the operating lever the line joining the centre of the crank and the centre of the pivot of the quadrant is substantially at right angles to the longitudinal axis of the connecting lever, and the operative stroke of the operating lever causes the crank to revolve through a suitable angle, say of about 90 degrees, moving with a motion which is compounded of motion longitudinal in respect of the connecting lever and motion to a progressively increasing extent transverse to that motion so that there is imparted to the quadrant and thereby to the rotary member a continuously increasing or accelerated angular movement measured in degrees for each consecutive degree of angular movement of the operating lever during the operative stroke of the latter.

3. In a shaving or hair clipping device according to claim 1 having a hand operating lever, and a casing serving as a support, means for actuating a movable cutter on said support, said means comprising a toothed quadrant connected with said hand operating lever and in mesh with a pinion associated with a one-way clutch device connected to and operating a train of gear wheels having a fly wheel associated therewith and being adapted to rotate said fly wheel, a member connected with the movable cutter, said fly wheel having a cam means serving to actuate said member connected with the movable cutter for reciprocating the latter, and a link and lever arrangement, and said quadrant being connected to the hand operating lever through the medium of said link and lever arrangement said link and lever arrangement being disposed in positions effective to impart a continuously increasing or accelerated angular motion to the rotating parts for each degree of angular movement of the hand operating lever during the operative stroke of the latter.

4. A shaving or hair clipping device according to claim 1, in which the operating lever is connected with the rotary member by means of a lever and link arrangement comprising the automatic acceleration means, one end of the link being connected by a lever arm to said operating lever, and the other end of the link being connected to the rotary member by means of another lever arm.

5. A shaving or hair clipping device according to claim 1, in which the operating lever is connected with the rotary member by means of a lever and link arrangement comprising the automatic acceleration means, one end of the link being connected by a lever arm to said operating lever, and the other end of the link being connected to the rotary member by means of another lever arm and in which the lever arm which connects the link to the operating lever is longer than the arm which connects the other end of the link to the rotary member.

6. A shaving or hair clipping device according to claim 1, in which resilient means are included and disposed in a position effective to return the hand operating lever after the latter has been moved to perform its driving stroke, so that said hand operating lever will assume an initial position preparatory to the execution of another driving or pressure stroke.

7. A shaving or hair clipping device according to claim 1, in which the rotary member is contained in the casing or handle from which the hand operating lever projects, the rotary member and gearing, including the hand operating lever, being constructed as a coherent self-contained unit which can bodily be readily placed into or removed intact from the casing or handle.

8. A shaving or hair clipping device according to claim 1, in which the rotary member is contained in the casing or handle from which the hand operating lever projects, the rotary member and gearing, including the hand operating lever, being constructed as a coherent self-contained unit which can bodily be readily placed into or removed intact from the casing or handle, and the rotary member and gearing is held between two connected frame members secured together in spaced relation, the hand operating lever also being pivotally mounted between the said frame members.

9. A shaving or hair clipping device according to claim 1, in which the rotary member is contained in the casing or handle from which the hand operating lever projects, the rotary member and gearing, including the hand operating lever, being constructed as a coherent self-contained unit which can bodily be readily placed into or removed intact from the casing or handle, and the rotary member and gearing is held between two connected frame members secured together in spaced relation, and wherein pins connect the link with the hand operating lever and the rotary member, the hand operating lever also being pivotally mounted between the said frame members and in which the connecting link between the hand operating lever and the rotary member is located on the outside of one frame member which is formed with slots to permit of the movement of the pins therein which connect the link with the hand operating lever and the rotary member.

10. A shaving or hair clipping device according to claim 1, in which mutually connected frame members carrying the rotary member and gearing and a torsion spring are included, said torsion spring being disposed in a position effective to control the hand operating lever, quadrant and other parts associated therewith acting on the quadrant itself and on a stationary part on the frame members carrying the rotary member and gearing.

11. A shaving or hair clipping device according to claim 1, in which mutually connected frame members are included for carrying the rotary member and gearing, and the casing or handle of the device comprises two parts which are internally grooved to receive the frame members carrying the rotary member and gearing.

12. Operating mechanism for a dry shaver or hair clipping device according to claim 1 in the form of a self-contained unit, comprising operating mechanism, a link, and at least one frame member with which the operating mechanism is arranged so that said unit is operable irrespective of any support or casing, said frame also having pivoted thereon an operating lever which is connected to one end of said link, whose other end is connected to part of the operating mechanism in a variable position and relation thereto causing a continuously increasing angular movement to be imparted to the rotary parts of the mechanism during each degree of the operative movement of the hand operating lever.

13. In a shaving or hair clipping device according to claim 1 having a manual operating lever, operating mechanism adapted to be actuated to impart rotary motion, comprising a member to be rotated, a toothed member, gearing interposed between said member to be rotated and said toothed member, a connecting member of predetermined length connected with said operating lever, a relatively shorter connecting member connected to said toothed member, a link pivotally connected to said connecting members, and acceleration means causing said operating member to be moved to perform a driving stroke when it causes the rotary movement imparted to said operating member to be continuously accelerated or increased for each degree or unit of movement of the operating lever.

14. In a shaving or hair clipping device according to claim 1, operating mechanism adapted to be actuated to impart rotary motion, comprising a member to be rotated, a toothed member, gearing interposed between said member to be rotated and said toothed member, a connecting member of predetermined length connected with said operating lever, a relatively shorter connecting member connected to said toothed member, a link pivotally connected to said connecting members, and acceleration means causing said operating member to be moved to perform a driving stroke when it causes the rotary movement imparted to said operating member to be continuously accelerated or increased for each degree or unit of movement of the operating lever, the longer connecting member being mounted in a position effective to partake of angular movement when the operating lever is moved in either direction, and being adapted to effect a compound movement of the operating link, that is to say, a longitudinal movement as well as a transverse movement of the said link so as to cause the necessary angular movement to be imparted to the shorter connecting member connected to the toothed member for the purpose of imparting the continuously increased or accelerated angular movement to the gearing and the rotary member for each degree or unit of angular movement of the operating lever throughout the operative stroke of the latter.

EDGAR HAROLD LAW.